United States Patent [19]
Lee

[11] Patent Number: 5,818,172
[45] Date of Patent: *Oct. 6, 1998

[54] LAMP CONTROL CIRCUIT HAVING A BRIGHTNESS CONDITION CONTROLLER HAVING $2^{ND}$, $3^{RD}$ AND $4^{TH}$ CURRENT PATHS

[75] Inventor: Chang-Hum Lee, Anyang-shi, Rep. of Korea

[73] Assignee: SamSung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 550,493

[22] Filed: Oct. 30, 1995

[30] Foreign Application Priority Data

Oct. 28, 1994 [KR] Rep. of Korea ................. 1994-27940

[51] Int. Cl.$^6$ ................................................. H05B 37/02
[52] U.S. Cl. .......................... 315/86; 315/247; 315/307; 315/226; 315/DIG. 4; 315/DIG. 7
[58] Field of Search ............................. 315/86, 307, 160, 315/175, 226, 225, DIG. 7, DIG. 4, 247

[56] References Cited

U.S. PATENT DOCUMENTS

| | | | |
|---|---|---|---|
| 5,065,357 | 11/1991 | Shiraishi et al. ...................... | 362/109 |
| 5,078,476 | 1/1992 | Shin ...................................... | 359/48 |
| 5,130,907 | 7/1992 | Tortola et al. ......................... | 395/200 |
| 5,144,292 | 9/1992 | Shirakishi et al. .................... | 340/784 |
| 5,184,117 | 2/1993 | Gauthier ............................... | 340/784 |
| 5,225,822 | 7/1993 | Shiraishi et al. ...................... | 340/784 |
| 5,247,286 | 9/1993 | Ishikawa ............................... | 395/3 |
| 5,313,225 | 5/1994 | Miyadera .............................. | 345/102 |
| 5,315,695 | 5/1994 | Saito et al. ............................ | 395/132 |
| 5,384,516 | 1/1995 | Kawabata et al. .................... | 315/160 |
| 5,384,577 | 1/1995 | McLaughlin et al. ................ | 345/102 |
| 5,406,305 | 4/1995 | Shimomura et al. ................. | 345/102 |
| 5,440,324 | 8/1995 | Strickling, III et al. ............. | 345/102 |

*Primary Examiner*—Robert J. Pascal
*Assistant Examiner*—Michael Shingleton
*Attorney, Agent, or Firm*—Robert E. Bushnell, Esq.

[57] ABSTRACT

A back light circuit for a liquid crystal display (LCD) includes: an alternating current (AC) adapter, a battery for supplying a direct current (DC) when the alternating current (AC) adapter is not used, an adapter detecting unit for determining whether or not the alternating current (AC) adapter is being used, a direct current/direct current (DC/DC) converter for providing output of a switched signal, a direct current/alternating current (DC/AC) converter for driving a cold cathode fluorescent lamp (CCFL) by increasing an electric potential, a cold cathode fluorescent lamp (CCFL) operated by the direct current/alternating current (DC/AC) converter, an on/off controller for controlling the direct current/direct current (DC/DC) converter, a brightness controller for controlling the brightness of the cold cathode fluorescent lamp (CCFL), a feedback unit for providing feed back signals to the direct current/direct current (DC/DC) converter, a brightness condition detector for determining the brightness condition of the back-light of the liquid crystal display (LCD), a low battery/very low battery (LB/LLB) signal transmitter for generating a signal indicating the residual amount of battery power when the battery is being used, and a brightness condition controller for determining a brightness condition of the back light of the liquid crystal display (LCD). The back light of the liquid crystal display (LCD) is adjusted based on the condition of the battery, and further based on whether the alternating current (AC) adapter is being used.

15 Claims, 3 Drawing Sheets

LAMP CONTROL CIRCUIT HAVING A
BRIGHTNESS CONDITION CONTROLLER
HAVING $2^{ND}$, $3^{RD}$ AND $4^{TH}$ CURRENT PATHS

CROSS-REFERENCE TO RELATED
APPLICATIONS

This application makes reference to, incorporates the same herein, and claims all benefits accruing under 35 U.S.C. §119 from an application for *Back Light Circuit For A Liquid Crystal Display* earlier filed in the Korean Industrial Property Office on 28 Oct. 1994 and there assigned Ser. No. 27940/1994.

BACKGROUND OF THE INVENTION

The present invention relates to a back light circuit for a liquid crystal display (LCD), and more particularly, to a circuit for driving a cold cathode fluorescent lamp (CCFL) to preserve battery power while providing the highest available degree of efficiency for back lighting the liquid crystal display (LCD). The present invention can be applied to liquid crystal displays (LCDs) of portable computers, such as notebook computers, pen computers or laptops.

The liquid crystal display (LCD) for a battery operated portable computer is typically fabricated by pouring a liquid crystal material between glass panels on which two light polarizing plates that intersect at 90 degrees are attached. If a voltage is applied to both plates, the portion where voltage is applied turns off the light since it is oriented in the direction of an electric field of liquid crystal molecules, and another portion where voltage is not applied transmits light distorted at 90 degrees through the liquid crystal molecules. Since the portion where the voltage is applied is split into squares of a minute size as cross stripes, this portion can display information, such as a word or picture, by separating darkness and colors.

With the liquid crystal display (LCD), displayed items can be clearly seen in bright places since the light transmitting portions are distinguished from the portions where light is not transmitted. However, it is difficult to visually discriminate displayed items in a dark place. Displays using a cathode ray tube (CRT) do not suffer from this problem since displayed items can be recognized in dark places without any light provided for the luminance and fluorescence of a fluorescent layer. The liquid crystal display (LCD) solves this problem by using back lighting equipment so that displayed items can be clearly recognized in dark places.

Presently, to provide the back light for a liquid crystal display (LCD), a cold cathode fluorescent lamp (CCFL) which does not generate a large amount of heat is widely used, rather than a general fluorescent lamp which does generate a large amount of heat.

To operate the cold cathode fluorescent lamp (CCFL), a direct current/alternating current (DC/AC) converter is needed. After the direct current/alternating current (DC/AC) converter is enabled during a set-up mode of the system, it is typically operated regardless of the condition of a battery, and the use of an alternating current (AC) adapter.

One prior art reference that seeks to control the back light of a liquid crystal display is disclosed in U.S. Pat. No. 5,225,822 entitled *Liquid Crystal Display System With Variable Backlighting For Data Processing Machine* issued to Shiraishi et al. on 6 Jul. 1993. In Shiraishi et al. '822, a liquid crystal display incorporating electroluminescent backlighting is provided with several degrees of luminosity. In particular, a selection circuit specifies a degree of luminosity to allow an electroluminescent backlighting panel to generate a selected luminosity level. While conventional art, such as Shiraishi et al. '822, possesses merit in its own right, I believe that improved means for controlling the back light of a liquid crystal display (LCD) can be contemplated. In particular, I believe there is a need to adjust the back light of a liquid crystal display (LCD) based on the condition of the battery, and further based on whether an alternating current (AC) adapter is being used.

SUMMARY OF THE INVENTION

Accordingly, it is an object of the present invention to provide an improved back light circuit for a liquid crystal display (LCD).

It is another object to provide a back light circuit for a liquid crystal display (LCD) which provides several degrees of brightness.

It is still another object to provide a back light circuit for a liquid crystal display that adjusts the back light of a liquid crystal display (LCD) based on whether an alternating current (AC) adapter is being used.

It is yet another object to provide a back light circuit for a liquid crystal display that adjusts the back light of a liquid crystal display (LCD) based on the condition of a battery.

It is still yet another object to provide a back light circuit for a liquid crystal display (LCD) that maximizes the available use time of a system.

It is a further object to provide a back light circuit for a liquid crystal display that optimizes power consumption for a system.

To achieve these and other objects, a back light circuit for a liquid crystal display (LCD) constructed according to the principles of the present invention contemplates: an alternating current (AC) adapter for converting alternating current (AC) into a direct current (DC), a battery for providing a direct current (DC) when the alternating current (AC) adapter is not used, an adapter detecting unit for determining whether or not the alternating current (AC) adapter is being used, a direct current/direct current (DC/DC) converter for receiving the direct current (DC) input and enabling output of a switched signal using a switching regulator, a direct current/alternating current (DC/AC) converter for driving a cold cathode fluorescent lamp (CCFL) by increasing an electric potential after converting the signal output from the direct current/direct current (DC/DC) converter, an on/off controller for turning the cold cathode fluorescent lamp (CCFL) off, a brightness controller for controlling the brightness of the cold cathode fluorescent lamp (CCFL) after receiving the signal output from the direct current/ alternating current (DC/AC) converter, a feedback unit for receiving an output signal from the brightness controller and feeding the signal back to the direct current/direct current (DC/DC) converter, a brightness condition detector for determining the brightness condition of the back light of the liquid crystal display (LCD) based on received signals indicating a physical condition of the brightness controller, a low battery/very low battery (LB/LLB) signal transmitter for generating a signal indicating the residual amount of battery power when battery power is being used, and a brightness condition controller for determining the brightness condition of the back light of the liquid crystal display (LCD) from the signals output from the adapter detecting unit, the low battery/very low battery (LB/LLB) signal transmitter and the brightness condition detector.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
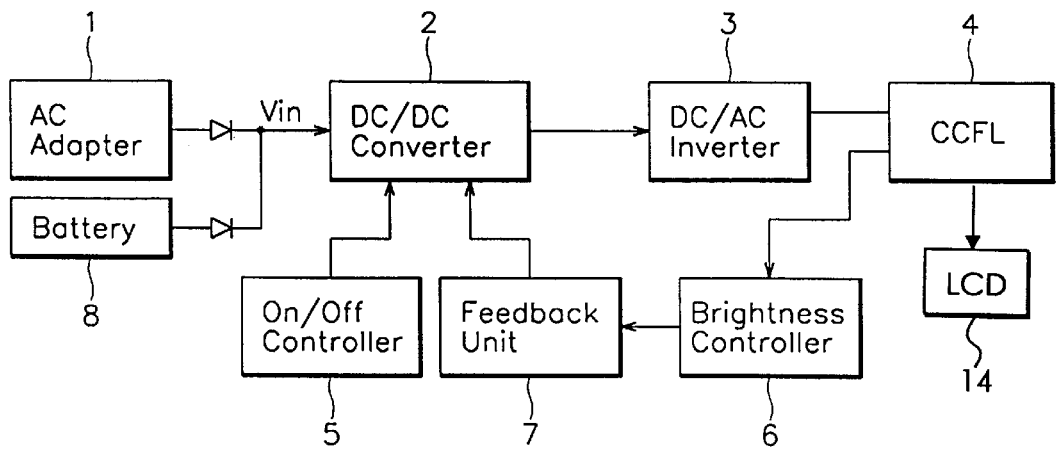
FIG. 1 is a block diagram of a conventional back light circuit for a liquid crystal display (LCD)

Turning now to the drawings and referring to FIG. 1, a block diagram of a conventional back light circuit for a liquid crystal display (LCD) 14 is illustrated. The back light circuit of FIG. 1 includes an alternating current (AC) adapter 1 for receiving alternating current (AC) for conversion into a direct current (DC), and a battery 8 for providing a direct current (DC) when the alternating current (AC) adapter is not used. A direct current/direct current (DC/DC) converter 2 receives the direct current (DC) input and enables output of a switched signal using a switching regulator. A direct current/alternating current (DC/AC) converter 3 drives a cold cathode fluorescent lamp (CCFL) 4 by increasing an electric potential after converting the signal output from direct current/direct current (DC/DC) converter 2. Cold cathode fluorescent lamp (CCFL) 4 is operated by direct current/alternating current (DC/AC) converter 3. An on/off controller 5 is provided to turn off cold cathode fluorescent lamp (CCFL) 4. A brightness controller 6 controls the brightness of cold cathode fluorescent lamp (CCFL) 4 after receiving the signal output from direct current/alternating current (DC/AC) converter 3. A feedback unit 7 receives an output signal from brightness controller 6 and feeds the signal back to direct current/direct current (DC/DC) converter 2.

Figure 2:
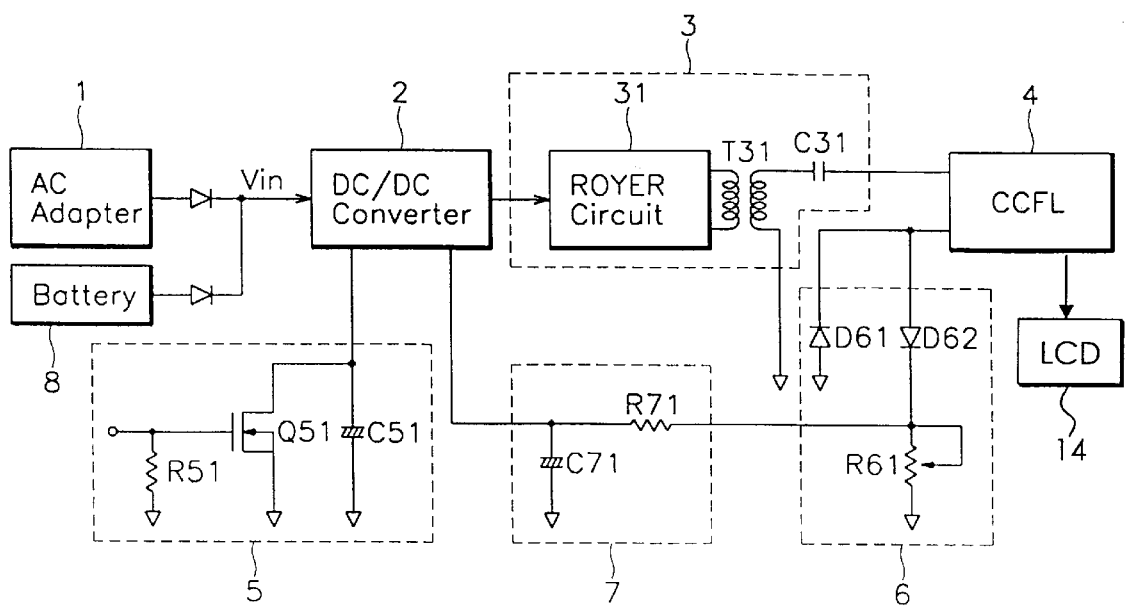
FIG. 2 is a circuit diagram of the conventional back light circuit for a liquid crystal display (LCD)

FIG. 2 is a circuit diagram of the conventional back light circuit for liquid crystal display (LCD) 14. On/off controller 5 generates an enable signal needed to turn off the back-light circuit and determines whether to drive direct current/direct current (DC/DC) converter 2 according to the logical state of a command signal when the command signal indicating whether to turn the back light circuit on or off is applied to a gate terminal of a metal oxide semiconductor field effect transistor MOSFET). The direct current (DC) output from alternating current (AC) adapter 1 and provided to direct current/direct current (DC/DC) converter 2 is converted into a pulse voltage by direct current/direct current (DC/DC) converter 2 comprised of a switching regulator, and is output to direct current/alternating current (DC/AC) converter 3. The signal provided to direct current/alternating current (DC/AC) converter 3 is divided into a positive value and a negative value through a transformer T31. The signal is then provided to operate cold cathode fluorescent lamp (CCFL) 4 in the case of a negative value, or is provided to brightness controller 6 in the case of a positive value. The output signal of brightness controller 6 is provided to direct current/direct current (DC/DC) converter 2 through feedback unit 7, and constantly suspends the current of cold cathode fluorescent lamp (CCFL) 4 by repeating this process. The detailed circuit components shown in FIG. 2 will be discussed later with reference to FIG. 4.

Since the back light circuit for liquid crystal display (LCD) 14 is used for a display device of a portable computer, alternating current (AC) adapter 1 may or may not be used. When alternating current (AC) adapter 1 is not used, direct current is provided through battery 8. When the direct current (DC) is provided to the back light circuit, whether it be from alternating current (AC) adapter 1 or battery 8, an alternating current (AC) signal capable of driving cold cathode fluorescent lamp (CCFL) 4 is provided to cold cathode fluorescent lamp (CCFL) 4 through direct current/direct current (DC/DC) converter 2 and direct current/alternating current (DC/AC) converter. When a user seeks to control the degree of brightness when cold cathode fluorescent lamp (CCFL) 4 is operated, the resistance value of a variable resistor R61 of brightness controller 6 is varied. Accordingly, the output signal from brightness controller 6, which is varied according to the variable resistance value, is provided to direct current/direct current (DC/DC) converter 2. A varied input voltage then operates cold cathode fluorescent lamp (CCFL) 4 after brightness control is performed through direct current/direct current (DC/DC) converter 2 and direct current/alternating current (DC/AC) converter 3.

The conventional back light circuit for liquid crystal display (LCD) 14, however, operates irrespective of the condition of battery 8 (i.e., when battery 8 is used instead of alternating current (AC) adapter 1). That is, the back light circuit is operated constantly regardless of the residual power of battery 8. Accordingly, when battery 8 possesses only a small quantity of residual power, battery 8 is discharged faster and system use time is reduced, often resulting in an insufficient time for data storage. In this case, in order to extend the time that the portable computer can be used, it is possible to use a battery having a large capacity. This, however, is not always practical since this type of battery is often too heavy and large for a compact portable computer.

In a preferred embodiment of the present invention, the same reference numbers are used for sections which have the same function as the conventional backlight circuit shown in FIGS. 1 and 2.

Figure 3:
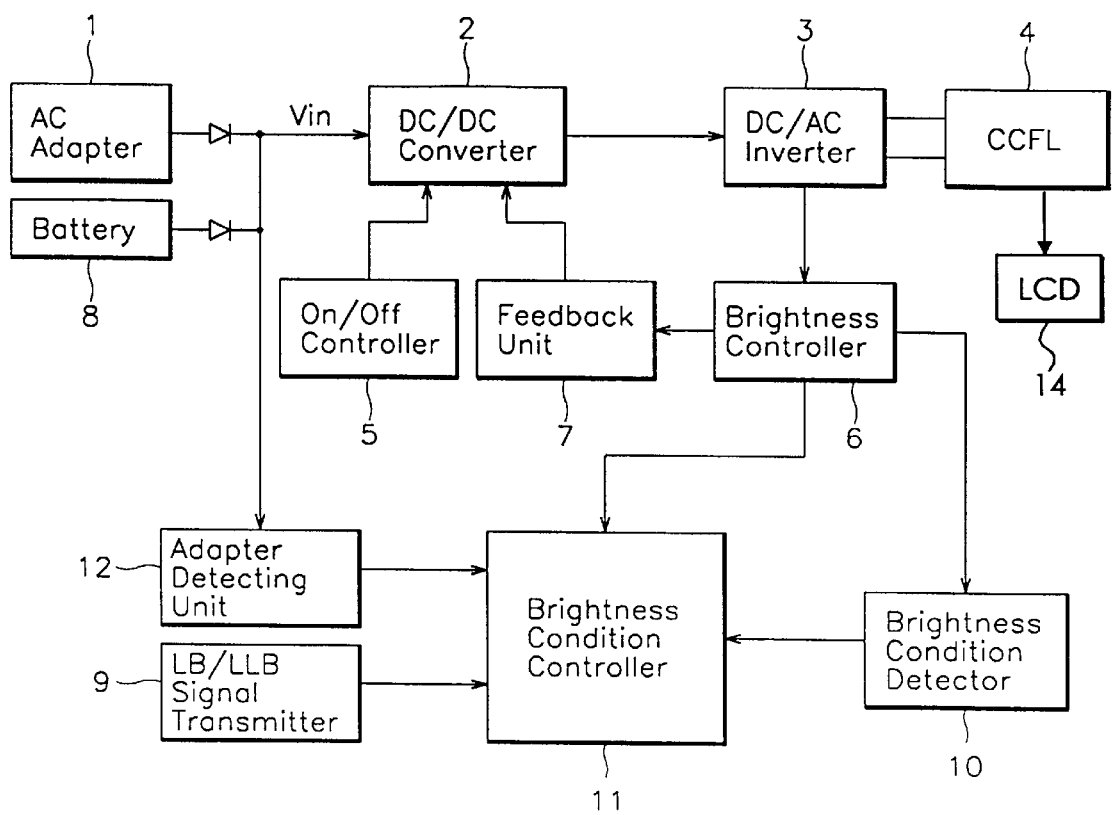
FIG. 3 is a block diagram of a back light circuit for a liquid crystal display (LCD) according to a preferred embodiment of the present invention.

Referring now to FIG. 3, a block diagram of a back light circuit for liquid crystal display (LCD) 14 according to a preferred embodiment of the present invention is shown. The block diagram of FIG. 3 includes alternating current (AC) adapter 1 for converting alternating current (AC) received from an output receptacle into a direct current (DC). Battery 8 provides a direct current (DC) when alternating current (AC) adapter 1 is not used. An adapter detecting unit 12 determines whether or not alternating current (AC) adapter 1 is being used. Direct current/direct current (DC/DC) converter 2 receives the direct current (DC) input and enables output of a switched signal using a switching regulator. Direct current/alternating current (DC/AC) converter 3 drives cold cathode fluorescent lamp (CCFL) 4 by increasing an electric potential after converting the switched signal output from direct current/direct current (DC/DC) converter 2. Cold cathode fluorescent lamp (CCFL) 4 is operated by direct current/alternating current (DC/AC) converter 3 and provides the back light for liquid crystal display (LCD) 14. On/off controller 5 is provided to drive direct current/direct current (DC/DC) converter 2 and turn off cold cathode fluorescent lamp (CCFL) 4. Brightness controller 6 controls the brightness of cold cathode fluorescent lamp (CCFL) 4 after receiving the signal output from direct current/alternating current (DC/AC) converter 3.

Feedback unit 7 receives an output signal from brightness controller 6 and feeds the signal back to direct current/direct current (DC/DC) converter 2. A brightness condition detector 10 determines the brightness condition of the back light of liquid crystal display (LCD) 14 based on received signals indicating a physical condition of brightness controller 6. A low battery/very low battery (LB/LLB) signal transmitter 9 generates signals indicating the residual amount of battery power when battery 8 is being used. A brightness condition controller 11 determines and controls the brightness of the back light of liquid crystal, display (LCD) 14 from the signals output from adapter detecting unit 12, low battery/very low battery (LB/LLB) signal transmitter 9 and brightness condition detector 10.

Figure 4:
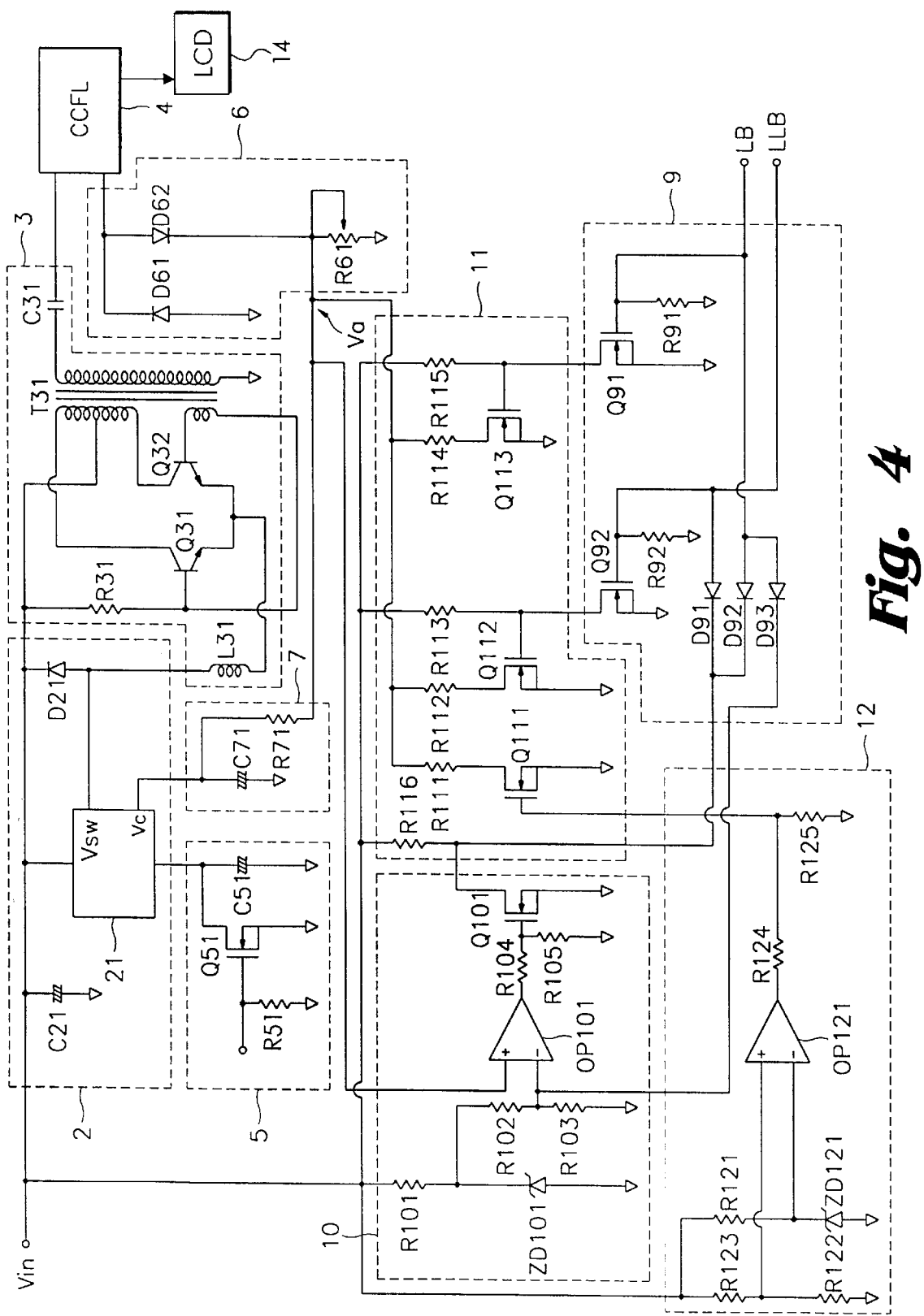
FIG. 4 is a circuit diagram of the back light circuit for the liquid crystal display (LCD) according to the preferred embodiment of the present invention.

Referring now to FIG. 4, a circuit diagram of the back light circuit for liquid crystal display (LCD) 14 according to the preferred embodiment of the present invention is shown.

Adapter detecting unit 12 includes a pair of resistors R121 and R122 connected between a direct current (DC) voltage Vin provided from alternating current (AC) adapter 1 or battery 8 and a ground potential in series. A resistor R123 is connected to resistor R121 in parallel and a Zener diode ZD121, which enables production of a constant voltage level, is connected to resistor R122 in series. A comparator OP121 has a non-inverting input terminal connected to the connection point of resistors R122 and R123, and an inverting input terminal connected to the connection point of resistor R121 and Zener diode ZD121. A pair of resistors R124 and R125 are connected to an output terminal of comparator OP121 and a ground potential in series.

Direct current/direct current (DC/DC) converter 2 includes a capacitor C21 connected between the direct current (DC) voltage Vin and a ground potential. A switching regulator 21 is constructed from a LT1172 chip, and a diode D21 has a cathode terminal connected to the direct current (DC) voltage Vin and an anode terminal connected to the output terminal Vsw of switching regulator 21.

Direct current/alternating current (DC/AC) converter 3 includes a coil L31 connected to the output terminal Vsw of switching regulator 21 of direct current/direct current (DC/DC) converter 2. A pair of transistors Q31 and Q32 have an emitter commonly connected to coil L31. A transformer T31 has a center tap connected to the base terminal of transistor Q31 through a resistor R31 to comprise a ROYER circuit, an input terminal connected between the base terminals of transistors Q31 and Q32, and an input terminal connected between the collector terminals of transistors Q31 and Q32. A capacitor C31 is connected to an output terminal of transformer T31 and provides the electrical current to cold cathode fluorescent lamp (CCFL) 4.

On/off controller 5 is used to turn off the back light generated by cold cathode fluorescent lamp (CCFL) 4 and comprises resistor R51 connected between an on/off command signal line and a ground potential. A transistor Q51 has a gate terminal connected to resistor R51, and a capacitor C51 is connected between a drain terminal of transistor Q51 and a ground potential.

Brightness controller 6 comprises a diode D61 connected between cold cathode fluorescent lamp (CCFL) 4 and a ground potential in negative direction. A diode D62 has an anode terminal connected to cold cathode fluorescent lamp (CCFL) 4. A variable resistor R61 is connected to an output terminal of diode D62 and a ground potential, thereby forming a first current channel.

Feedback unit 7 comprises a resistor R71 having one terminal connected to an output terminal of brightness controller 6, and a capacitor C71 connected between the other terminal of resistor R71 and a ground potential.

Brightness condition detector 10 comprises a resistor R101 and a Zener diode ZD101 connected between the direct current (DC) voltage Vin and a ground potential in series. A pair of resistors R102 and R103 are connected to Zener diode ZD101 in series. A comparator OP101 has an inverting input terminal connected to the connection point of resistors R102 and R103. A pair of resistors R104 and R105 are connected between an output terminal of comparator OP101 and a ground potential in series. A field effect transistor Q101 has a gate terminal connected to the connection point of resistors R104 and R105.

Low battery/very low battery (LB/LLB) signal transmitter 9 comprises a resistor R91 connected between a ground potential and a low battery (LB) signal line which transmits a low battery signal (LB) from a system board according to the condition of battery 8. A transistor Q91 has a gate terminal connected to resistor R91. A resistor R92 is connected between a ground potential and a very low battery (LLB) signal line which transmits a very low battery signal (LLB) from the system board. A transistor Q92 has a gate terminal connected to resistor R92. A diode D91 has an anode terminal connected to the very low battery (LLB) signal line, and diodes D92 and D93 each have anode terminals connected to the low battery (LB) signal line.

Brightness condition controller 11 comprises a resistor R111 forming a second current channel with a transistor Q111 having a gate terminal connected to an output terminal of adapter detecting unit 12. Resistors R112 and R113 form a third current channel with a transistor Q112 having a gate terminal connected to an output terminal of low battery/very low battery (LB/LLB) signal transmitter 9. Resistors R114 and R115 form a fourth current channel with a transistor Q113 having a gate terminal connected to the output terminal of low battery/very low battery (LB/LLB) signal transmitter 9. When electrical power is provided, the back light circuit for liquid crystal display (LCD) 14 according to a preferred embodiment of the present invention is operated.

Four brightness modes of the back light for liquid crystal display (LCD) 14 according to the battery condition are shown in Table 1 below.

TABLE 1

| current channel | Ch1 | Ch2 | Ch3 | Ch4 |
| --- | --- | --- | --- | --- |
| AC adapter 1 used | 0 | 0 | 0 | 0 |
| Battery 8 used | | | | |
| normal | 0 | X | 0 | 0 |
| low (LB) | 0 | X | 0 | X |
| very low (LLB) | 0 | X | X | 0 |
| reference resistor | R61 | R111 | R112 | R114 |

The back light for liquid crystal display (LCD) 14 is operated by brightness condition controller 11 in four separate modes. First, when power is provided via alternating current (AC) adapter 1, the four current channels Ch1 to Ch4 should be operated in order to provide maximum brightness. However, when battery 8 is used instead of alternating current (AC) adapter 1, three separate modes can be provided depending upon the residual power level of battery 8. When battery power is in a normal condition (i.e., a normal battery operating mode), current channel Ch2 is not be operated in order to preserve battery power by lowering the brightness of the back light. When battery power is in a low condition, second and fourth channels Ch2 and Ch4 are not operated, and the back light is darker than when the battery power is in the normal condition. When the battery power is in a very low condition, and therefore system use time matters, a very low battery (LLB) mode is activated and battery power is maximized by not operating second and third current channels Ch2 and Ch3.

Brightness controller 6 controls the brightness of cold cathode fluorescent lamp (CCFL) 4 (i.e., the back light) according to the resistance value exhibited by variable resistor R61. Namely, if the resistance value of variable resistor R61 is decreased by a user, the output voltage Va is decreased and a greater current flow is produced. Accordingly, cold cathode fluorescent lamp (CCFL) 4 generates a brighter back light. On the other hand, if the resistance value of variable resistor R61 is increased by the user, the output voltage Va is increased and current flow decreases. Thus, cold cathode fluorescent lamp (CCFL) 4 generates a darker back light.

If alternating current (AC) adapter 1 is used, as adapter detecting unit 12 operates field effect transistor Q111 of brightness condition controller 11, the current flowing to cold cathode fluorescent lamp (CCFL) 4 to generate the back light is determined based on the values exhibited by variable resistor R61 and resistor R111 of brightness condition controller 11 according to the following equation:

$$I_L = Va[R61*R111)/(R61+R111)]*2 \qquad \text{<Equation 1>}$$

Where the resistance value of resistor R111 is set to a small value in order to generate maximum brightness.

As illustrated in Equation 1, the brightness of the back light generated by cold cathode fluorescent lamp (CCFL) 4 is determined by the resistance value exhibited by variable resistor R61.

In adapter detecting unit 12, the inverting input terminal of comparator OP121 suspends the voltage of Zener diode ZD121 by the direct current (DC) voltage Vin. In this condition, if alternating current (AC) adapter 1 is used, the direct current (DC) voltage Vin is increased, and the voltage provided to the non-inverting input terminal of comparator OP121 is increased proportionally by resistors R123 and R122 that dissipate the voltage, so that the output from comparator OP121 is generated at a logic high level. The output signal from comparator OP121 is applied to the gate terminal of the metal oxide semiconductor field effect transistor (MOSFET) Q111 of brightness condition controller 11 through resistor R124 to turn on transistor Q111. When transistor Q111 is turned on, the current flowing through cold cathode fluorescent lamp (CCFL) 4 increases, and the back light is generated. In this case, since neither the low battery (LB) signal nor the very low battery (LLB) signal is input, transistors Q112 and Q113 of brightness condition controller 11 are turned on and the brightness of the back light generated by cold cathode fluorescent lamp (CCFL) 4 is in a maximum state. Alternatively, if alternating current (AC) adapter 1 is not used, the direct current (DC) voltage Vin is generated at the voltage level of battery 8, the voltage applied to the non-inverting input terminal of comparator OP121 of adapter detecting unit 12 is below the voltage applied to the inverting input terminal, and the metal oxide semiconductor field effect transistor (MOSFET) Q111 is turned off. Accordingly, the first current channel Ch1 is turned off.

In this case, the brightness of the back light generated by cold cathode fluorescent lamp (CCFL) 4 is controlled according to the condition of battery 8 by turning transistors Q112 and Q113 of brightness condition controller 11 on or off according to the low battery (LB) signal and the very low battery (LLB) signal. Brightness condition detector 10 detects the present brightness of the back light according to the output voltage Va of brightness controller 6, and controls the brightness of the backlight generated by cold cathode fluorescent lamp (CCFL) 4.

When the output voltage Va of brightness controller 6 is below the constant voltage value formed by the dissipating resistances of R102 and R103 of brightness condition detector 10, that is, when the voltage applied to the non-inverting input terminal of comparator OP101 is lower than the constant voltage applied to the inverting input terminal in brightness condition detector 10, metal oxide semiconductor field effect transistor (MOSFET) Q101 is turned off since the output provided from comparator OP101 is at a logic low level. As described above, if transistor Q101 of brightness condition detector 10 is turned off, brightness condition detector 10 does not effect the operation of the entire circuit. In this state, as the residual power level of battery 8 decreases, as when R111<(R112*R113)/(R112+R113), power consumption is less than when alternating current (AC) adapter 1 is used. However, if the low battery signal (LB) is generated, the metal oxide semiconductor field effect transistor (MOSFET) Q91 of low battery/very low battery (LB/LLB) signal transmitter 9 is turned on, so that the gate terminal of the metal oxide semiconductor field effect transistor (MOSFET) Q113 of brightness condition controller 11 receives a signal at a logic low level, thus turning transistor Q113 off. At this time, the brightness of the back light generated by cold cathode fluorescent lamp (CCFL) 4 is determined in accordance with the resistance values of resistors R61 and R114.

If the very low battery (LLB) signal is generated to indicate that the residual power level of battery 8 has decreased, the metal oxide semiconductor field effect transistor (MOSFET) Q92 of low battery/very low battery (LB/LLB) signal transmitter 9 is turned on, thus causing the metal oxide semiconductor field effect transistor (MOSFET) Q112 of brightness condition controller 11 to turn off. Therefore, the brightness of the backlight generated by cold cathode fluorescent lamp (CCFL) 4 is automatically minimized.

However, when the output voltage Va from brightness controller 6 is above the constant voltage value formed by the dissipating resistances of R102 and R103 of bright condition detector 10, that is, when the back light generated by cold cathode fluorescent lamp (CCFL) 4 is faint and the voltage input to the non-inverting input terminal of comparator OP101 is greater than the constant voltage input to the inverting input terminal, the metal oxide semiconductor field effect transistor MOSFET) Q101 is turned on since the output signal from comparator OP101 is generated at a logic high level. As described above, if the metal oxide semiconductor field effect transistor (MOSFET) Q101 of brightness condition detector 10 is turned on, the voltage applied to the drain terminals of transistors Q91 and Q92 of low battery/very low battery (LB/LLB) signal transmitter 9 is decreased, and thus the metal oxide semiconductor field effect transistors (MOSFET) Q91 and Q92 of low battery/very low battery (LB/LLB) signal transmitter 9 are not operated even though low battery (LB) signal and the very low battery (LLB) signal are input.

In this case, if the back light generated by cold cathode fluorescent lamp (CCFL) 4 is faint, the very low battery (LLB) signal should be applied to the inverting input terminal of comparator OP101 simultaneously with voltage Vin in order to prevent the output voltage from brightness controller 6 from increasing and comparator OP101 of brightness condition detector 10 from being turned on.

On/off controller 5 is used for turning off the back light generated by cold cathode fluorescent lamp (CCFL) 4 for liquid crystal display (LCD) 14. If an input signal is at a logic high level, the metal oxide semiconductor field effect transistor (MOSFET) Q51 is turned on and the entire direct current/direct current (DC/DC) converter 2 is turned off. Alternatively, if an input signal is at a logic low level, the metal oxide semiconductor field effect transistor (MOSFET) Q51 is turned off and direct current/direct current (DC/DC) converter 2 is normally operated.

Switching diode D61 of brightness controller 6 operates cold cathode fluorescent lamp (CCFL) 4 when capacitor C31 is charged to a negative voltage level, and operates to control the voltage level through diode D62 in the case of a positive voltage level. This characteristic is used to control cold cathode fluorescent lamp (CCFL) 4.

In the preferred embodiment of the present invention, which can be applied to a portable computer, a back light circuit for liquid crystal display (LCD) 14 is provided to maximize system use time by optimizing power consumption. Namely, the system maximizes the back light brightness when alternating current (AC) adapter 1 is used, and the back light brightness is controlled in accordance with a sensed condition of battery 8 when battery 8 is used instead of alternating current (AC) adapter 1.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A back light circuit for a liquid crystal display, said circuit comprising:

an alternating current adapter for receiving alternating current and converting said alternating current to generate a direct current;

a battery for providing said direct current when said alternating current adapter is not being used to generate said direct current;

an adapter detecting unit for determining whether said alternating current adapter is being used to generate said direct current;

a direct current/direct current converter for receiving said direct current and providing output of a switched signal via a switching regulator;

a direct current/alternating current converter for driving a cold cathode fluorescent lamp by generating an increased electric potential after converting said switched signal output from said direct current/direct current converter;

said cold cathode fluorescent lamp operated by said direct current/alternating current converter for providing back light for said liquid crystal display;

an on/off controller for controlling driving of said direct current/direct current converter to interrupt operation of said cold cathode fluorescent lamp;

a brightness controller having a first current channel for controlling a degree of brightness of said back light provided by said cold cathode fluorescent lamp;

a feedback unit for receiving an output signal from said brightness controller and providing said output signal from said brightness controller to said direct current/direct current converter;

a brightness condition detector for determining said degree of brightness of said back light based on said output signal from said brightness controller;

a battery signal transmitter for generating signals indicating a residual amount of battery power when said battery is being used to provide said direct current; and a brightness condition controller having second, third and fourth current channels for determining and controlling said degree of brightness of said back light in response to signals output from said adapter detector, said battery signal transmitter and said brightness condition detector.

2. The back light circuit as defined in claim 1, wherein said adapter detecting unit comprises a Zener diode for enabling generation of a constant reference voltage and a comparator for comparing said constant reference voltage with an input voltage.

3. The back light circuit as defined in claim 1, wherein said brightness condition detector is operated based on a voltage level of a signal input to said brightness controller.

4. The back light circuit as defined in claim 1, wherein said first current channel of brightness controller comprises a variable resistor and controls said degree of brightness of said back light based on a resistance value exhibited by said variable resistor.

5. The back light circuit as defined in claim 1, wherein each of said first to fourth current channels are operated when said back light is in a brightest mode, and two of said first to fourth current channels are operated when said back light is in a darkest mode.

6. The back light circuit as defined in claim 1, wherein each of said first to fourth current channels are operated when said alternating current adapter is being used to generate said direct current, and less than each of said first to fourth current channels are operated when said battery is being used to generate said direct current.

7. A circuit for controlling back lighting of a liquid crystal display, said circuit comprising:

an alternating current adapter for receiving alternating current and converting said alternating current to generate a direct current used to produce said back lighting of said liquid crystal display;

battery means for providing said direct current used to produce said back lighting of said liquid crystal display when said alternating current adapter is not being used to generate said direct current;

means for determining whether said alternating current adapter is being used to generate said direct current; and control means for automatically controlling said back lighting of said liquid crystal display based on whether said alternating current adapter is being used to generate said direct current, and further based on a detected level of residual power of said battery means and a voltage indicative of a present degree of brightness of said back lighting, said control means enabling said back lighting of said liquid crystal display to be exhibited at a brightest level when said alternating current adapter is being used to generate said direct current, said control means enabling said back lighting of said liquid crystal display to be exhibited at one of three different brightness levels having a lower intensity than said brightest level when said battery means is being used to generate said direct current, wherein none of said three different brightness levels represent an off state of said liquid crystal display.

8. The circuit as defined in claim 7, wherein said control means enables said back lighting of said liquid crystal display to be exhibited at a darkest level when said residual power of said battery means is at a lowest level.

9. The circuit as defined in claim 7, further comprising a cold cathode fluorescent lamp for generating said back lighting of said liquid crystal display.

10. A circuit for controlling back lighting of a liquid crystal display, said circuit comprising:

an alternating current adapter for receiving alternating current and converting said alternating current to generate a direct current used to produce said back lighting of said liquid crystal display;

battery means for providing said direct current used to produce said back lighting of said liquid crystal display when said alternating current adapter is not being used to generate said direct current;

means for generating said back lighting of said liquid crystal display in response to said direct current; and control means for automatically controlling said back lighting of said liquid crystal display based on whether said alternating current adapter is being used to generate said direct current, and further based on a detected level of residual power of said battery means and a voltage indicative of a present degree of brightness of said back lighting, said control means enabling said back lighting of said liquid crystal display to be exhibited at a brightest level when said alternating current adapter is being used to generate said direct current, said control means enabling said back lighting of said liquid crystal display to be exhibited at one of three different brightness levels having a lower intensity than said brightest level when said battery means is being used to generate said direct current, wherein none of said three different brightness levels represent an off state of said liquid crystal display.

11. The circuit as defined in claim 10, wherein said plurality of brightness levels comprises three different brightness levels.

12. The circuit as defined in claim 10, wherein said control means enables said back lighting of said liquid crystal display to be exhibited at a darkest level when said residual power of said battery means is at a lowest level, wherein said darkest level does not represent an off state of said liquid crystal display.

13. The circuit as defined in claim 12, wherein said means for generating said back lighting of said liquid crystal display comprises a cold cathode fluorescent lamp.

14. A back light circuit for a liquid crystal display, said circuit comprising:

an alternating current adapter for receiving alternating current and converting said alternating current to generate a direct current;

a battery for providing said direct current when said alternating current adapter is not being used to generate said direct current;

an adapter detecting unit for determining whether said alternating current adapter is being used to generate said direct current;

a direct current/direct current converter for receiving said direct current and providing output of a switched signal via a switching regulator;

a direct current/alternating current converter for driving a cold cathode fluorescent lamp by generating an increased electric potential after converting said switched signal output from said direct current/direct current converter;

said cold cathode fluorescent lamp operated by said direct current/alternating current converter for providing back light for said liquid crystal display;

an on/off controller for controlling driving of said direct current/direct current converter to interrupt operation of said cold cathode fluorescent lamp;

a brightness controller having a first current channel comprising a variable resistor for controlling a degree of brightness of said back light provided by said cold cathode fluorescent lamp based on a resistance value exhibited by said variable resistor;

a feedback unit for receiving an output signal from said brightness controller and providing said output signal from said brightness controller to said direct current/direct current converter;

a brightness condition detector for determining said degree of brightness of said back light based on said output signal from said brightness controller;

a battery signal transmitter for generating signals indicating a residual amount of battery power when said battery is being used to provide said direct current; and a brightness condition controller having second, third and fourth current channels for determining and controlling said degree of brightness of said back light from in response to signals output from said adapter detector, said battery signal transmitter and said brightness condition detector;

said second current channel comprising a first field effect transistor having a gate terminal connected to an output terminal of said adapter detector and a first resistor connected between said first field effect transistor and said variable resistor;

said third current channel comprising a second field effect transistor having a gate terminal connected to a first output terminal of said battery signal transmitter and a second resistor connected between said second field effect transistor and said variable resistor; and said fourth current channel comprising a third field effect transistor having a gate terminal connected to a second output terminal of said battery signal transmitter and a third resistor connected between said third field effect transistor and said variable resistor.

15. The circuit as set forth in claim 14, said brightness condition controller further comprising:

a fourth resistor connected between an output terminal of said brightness condition detector and said gate terminal of said second field effect transistor; and a fifth resistor connected between said output terminal of said brightness condition detector and said gate terminal of said third field effect transistor.

* * * * *